United States Patent [19]
Rieber

[11] Patent Number: 5,942,115
[45] Date of Patent: Aug. 24, 1999

[54] SELF FLOCCULATING SEPARATION MEDIUM AND METHOD

[75] Inventor: Roy S. Rieber, Houston, Tex.

[73] Assignee: enviroGuard, Inc., Houston, Tex.

[21] Appl. No.: 08/821,389

[22] Filed: Mar. 20, 1997

Related U.S. Application Data

[62] Division of application No. 08/390,627, Feb. 17, 1995, Pat. No. 5,637,229.

[51] Int. Cl.⁶ .................................................. B01D 24/00
[52] U.S. Cl. ........................... 210/503; 252/175; 252/181
[58] Field of Search ................................... 252/175, 181; 210/503

[56] References Cited

U.S. PATENT DOCUMENTS

| | | | |
|---|---|---|---|
| 3,020,231 | 2/1962 | Colwell et al. | 210/732 |
| 3,235,492 | 2/1966 | Andresen et al. | 210/778 |
| 3,300,406 | 1/1967 | Pollio . | |
| 4,089,831 | 5/1978 | Chambers | 210/732 |
| 4,548,719 | 10/1985 | Scordialo | 210/778 |
| 4,559,143 | 12/1985 | Asada et al. | 210/778 |
| 5,106,510 | 4/1992 | Rieber | 210/717 |
| 5,178,774 | 1/1993 | Payne et al. | 210/727 |
| 5,207,910 | 5/1993 | Rieber | 210/503 |

FOREIGN PATENT DOCUMENTS

| | | | |
|---|---|---|---|
| 26626 | 7/1977 | Japan | 210/732 |
| 52000 | 3/1983 | Japan | 210/732 |
| 93788 | 6/1983 | Japan | 210/732 |

*Primary Examiner*—Neil McCarthy
*Attorney, Agent, or Firm*—James F. Weiler

[57] ABSTRACT

Disclosed is a combined flocculating and clarifying medium for flocculating and separating solid particles from waste water comprising a mixture of solid filtering or aggregating particles and a dry flocculating agent effective to flocculate the solid particles to form larger and heavier aggregates with the filtering or aggregating particles in the waste water and filtering or gravity separating the formed aggregate from the waste water. Preferably, the filtering and aggregating particles are silicious particles, such as rice hull ash, diatomaceous earth, and perlite. The flocculating and clarifying medium can be combustible or can chemically fix the aggregated solid particles in a silicious cement, which solid particles can include heavy metal particles in silicious cement.

19 Claims, No Drawings

SELF FLOCCULATING SEPARATION MEDIUM AND METHOD

This application is a division of application Ser. No. 08/390,627 filed Feb. 17, 1995, now U.S. Pat. No. 5,637,229.

FIELD OF THE INVENTION

The present invention relates to separation mediums, such as gravity separators and filter aids for and methods of separating or filtering solids from waste water.

BACKGROUND OF THE INVENTION

Large quantities of liquids containing unfiltered solid particles, such as liquid waste, in the past have been discharged in the environment without filtration separation. Current federal and state regulations limit the discharge of such liquids and liquid wastes into the environment. U.S. Pat. No. 4,465,605 is directed to filtration of solids from waste with biogenetic silica, such as rice hull ash, which provides good filtration. U.S. Pat. No. 5,362,407 is directed to gravity clarifiers or separators for gravity separating solid particles in liquids, such as oil or oil and water.

Waste waters containing large quantities of hazardous metals have been discharged in the environment without treatment. Current federal and state regulations limit the hazardous metal concentrations in waste water and are extremely severe and are frequently based on analytical detection limits. Most metals are present in the waste water concentrations which can range from 10 to 4000 parts per million. Under some current regulations, all hazardous metal concentrations in waste water are required to be less than 300 parts per million and some to less than 1 part per billion. The hazardous materials include cadmium, chromium, copper, lead, manganese, selenium, as well as others. In addition, it is desirable to remove and sequester into the removed solids (filter cake) all metals, some of which are currently considered to be nonhazardous, such as zinc. U.S. Pat. Nos. 5,106,510 and 5,207,910 are directed to combined filtration and fixation of heavy metals.

European patent application (PCT) published on Dec. 29, 1993 under Publication No. 0575329 is directed to a filter aid or medium and a method of filtering liquid wastes which have good filtration, good flow rates through the filter cake, and have a heat value of the resulting filter cake containing the filtered solids of at least 5000 Btu per pound of filter aid; and this qualifies as a fuel for industrial boilers, furnaces, and kilns. Combustible filtering particles, such as rubber particles, in a size effective to filter the particles, alone or with up to about 70 percent silicious filtering particles, are set forth.

Coagulation/flocculation agents are utilized in water filtration and clarification applications. Coagulation and flocculation are essentially an electro-physical phenomena where particles of like electrostatic charge are pulled together using an agent with the opposite charge. Thus, the charged contaminated particle and the flocculating agent draw together and combine to make a larger and heavier particle or aggregate. Since larger and heavier particles are generally the easiest to settle out of and separate from waste water, such as by gravity separation or by filtering, this separate flocculation technology is common in water treatment.

Both natural and synthetic coagulation/flocculation agents have been used. Commonly used synthetic flocculating agents are organic based high molecular weight polyacrylamides, polyamines, amine quaternary ammonium and others. These polymers are soluble in water and can be manufactured with specifically designed charge polarity and magnitude. Polymers are commonly sold in dry, emulsion, and liquid form. Polymeric water treatment flocculation chemicals are a huge commercial industry with many large and small companies involved in the manufacture and sales of the product. Among natural coagulation/flocculation agents are natural clay type polymers from Cetco (a division of American Colloid), Biomin, and Southern Clay, natural alums, iron, sulfates, ferric chloride, calcium chloride and swelling clays. These coagulation/flocculation agents can be cationic, anionic, or nonionic and are added separately to the waste water to be filtered or cleared.

Coagulation/flocculation agents when added to waste water separately or by themselves are difficult to use because of their complicated and troublesome material handling characteristics. In dry form, synthetic polymers have to be diluted twice prior to use. The first dilution is critical because the particles have to be individually wetted or they will flock themselves prior to complete dispersion making an ineffective mess. There is no recovery from this development; and when it occurs, the mess must be discarded, which is a problem in and of itself, and the process started again.

Liquid and emulsion polymers largely solve this problem, but they generate problems of their own. They dramatically raise the costs of using organic polymers. Also, the liquid and emulsion products cannot be made as concentrated dry products so more pounds of liquid/emulsion polymers are required for a reaction equivalent to the former.

In both cases polymer solutions are extremely slippery, sticky, and tenacious materials that create serious safety hazards if spilled. When overdosed, they tend to create undesirable consequences involving the contaminant particles, that are stringy, clumpy floccs in waste water equipment. If extremely overdosed, the excess polymer gets onto apparatus surfaces which creates problems especially if the excess gets into filter screens and cloths which it clogs thus interrupting the filtration operation.

Although polymer flocculation is quite effective at massing smaller particles into larger, more manageable, or filterable particles, there are additional problems. Polymer formed floccs are gelatinous, deformable globs that are quite delicate to handle. If over agitated, the floccs degrade to smaller particles that are difficult to remove. Even in their largest form they are deformable which makes them difficult to filter. Thus, flocculation makes large aggregates that are easier to filter but makes deformable aggregates that are difficult to filter.

In addition, in many waste water treatment operations, polymers are only one of the chemicals added. Precipitants, oxidizers, and other agents are often included in the treatment protocol. In a great many occasions, filter aids are also required to defeat the problems created by the deformable nature of the floccs.

It would be highly desirable to provide a combined flocculating and clarifying medium which has the advantages of flocculation and coagulation of smaller particles into larger aggregates which do not deform under the conditions of use, such as in filtering, and add weight so that they readily settle or sink in the waste water in gravity separation, and methods of separating solids from waste waters, such as by gravity or filtering which avoids problems involved with the separate application of coagulant/flocculating agents to waste waters in removing solids from them.

SUMMARY OF THE INVENTION

The present invention is directed to a combined flocculating and clarifying medium for and methods of separation of solids from waste waters, such as by filtering or gravity clarification by which the above advantages are obtained, the problems of separate introduction of coagulation/flocculation agents are avoided, and by which good settling characteristics and filtration characteristics with good flow rates are obtained.

The foregoing is obtained by combining a dry flocculating agent (either synthetic or natural) with solid aggregating particles which provides self flocculating and aggregating particles which perform better than either component alone and in which the combination of flocculent agent and clarifying medium solves a number of problems associated with separately introducing flocculating agents into the waste water to be filtered or cleared. The combined flocculating and clarification medium of the present invention comprises a mixture of dry flocculating agent and solid aggregating or filtering particles, the dry flocculating agent flocculating the solid particles in the waste water with the aggregating or filtering particles to form larger and heavier aggregates effective for gravity clarification and/or filtration of the flocculated solid aggregates from the waste water.

The flocculating agent can be natural or synthetic or a mixture thereof. A preferred range for most flocculating agents is from about 0.1 percent to about 85 percent by weight of the combined filter aid. Preferably, in utilizing natural flocculating agents, the amount ranges from about 25 percent to about 85 percent by weight of the mixture, and when utilizing synthetic flocculating agents, from about 0.1 percent to about 5 percent by weight of the mixture.

The flocculating agent can be cationic, anionic, or nonionic depending on the solid particles to be flocculated and filtered or cleared.

The aggregating particles are solid particles, preferably silicious particles or silicious particles combined with combustible particles, such as rubber particles, coal fines, petroleum cake, and mixtures thereof. The silicious particles preferably comprise biogenetic silica particles, such as rice hull ash and particles from plants that contain high quantities of silica, such as stalks and hulls of rice, esquisetum (horsetail weeds), certain bamboos and palm leaves, particularly polymra, pollen, and the like, all of which when burned leave a porous ash that is highly desirable as a filtration aid. The silicious particles include diatomaceous earth and perlite.

Accordingly, it is an object of the present invention to provide a combined flocculating and clarification medium for separating solids from waste waters which avoids the problems of separate addition of coagulation/flocculating agents to the waste waters.

A further object of the present invention is to provide a flocculating filter aid which avoids the problems of separate addition of coagulation/flocculating agents to waters in filtering solids from them.

A further object of the present invention is to provide a flocculating gravity separation medium which avoids the problems of separate addition of coagulation/flocculating agents to waters in gravity separation of solids from them.

It is a further object of the present invention to provide a method of separation or clarification of particles from waste water, such as by filtration or by gravity separation, which includes flocculation of the particles with solid aggregating particles into heavier and larger solid aggregates in waste water which has the aforementioned desirable properties and advantages.

It is a further object of the present invention to provide a combined flocculating and clarifying medium, such as a filter aid and a gravity separating medium for flocculating solid particles in waste waters with solid aggregating particles and filtering or gravity separating the flocculated solid aggregates from waste waters which comprises a mixture of solid filtering or aggregating particles and a dry flocculating agent effective to aggregate at least a portion of the solid particles with the filtering or to aggregate particles in the waste water effective to filter or gravity separate the flocculated solid aggregates from the waste water.

It is still a further object of the present invention to provide such a flocculating filter aid in which the resulting filter cake has a sufficient heating or Btu content for incineration as a fuel for industrial boilers, furnaces, and kilns under federal recycling regulations.

A further object of the present invention is to provide such a flocculating filter medium in which precipitated dissolved metals in waste waters are flocculated with solid aggregates to form filter particles, filtered, and chemically fixed in the filter medium, the resulting filter medium being nontoxic and nonhazardous.

Other and further objects, features, and advantages appear throughout the specification and claims.

DESCRIPTION OF THE PREFERRED EMBODIMENTS

The present invention is directed to a combined flocculating and clarification medium, such as a filter aid or gravity separation aid or medium and methods therefor in which solid particles in waste water, and particularly small particles, are flocculated by the combined flocculating and clarification medium with solid aggregating particles to form larger aggregates which do not deform under conditions of use in filtering or gravity separating them from the waste water. The combined clarification flocculating medium comprises a mixture of solid aggregation or filter particles, and a dry flocculating agent effective to flocculate the solid particles in the waste water and aggregate them with the aggregation or filter particles to form larger or heavier flocculated aggregates effective to gravity separate or filter from the waste water. The flocculating agent (coagulant/flocculent) can be natural or synthetic, cationic, anionic, or nonionic, and can have any desired molecular weight. Examples of natural coagulants used in the technology are natural alums, iron sulfates, ferric chloride, calcium chloride, and swelling clays. Examples of synthetic flocculents are polyacrylamides, polyamines, and others. The flocculent component ranges from 0.1 percent to 85 percent. The natural products tend to work best at 25 percent to 80 percent by weight of the total blend, and synthetic products work best at 0.1 percent to 5 percent by weight of the total blend.

The aggregation particles can be any solid particles which will form aggregates with the solid particles in waste waters by flocculation.

The filter aid particles can be any particles which effectively filter solids from liquids. Filter aid vendors offer their products in grades which vary in particle size distribution which match proper grade (particle size) for filtration. Preferably, silicious particles or combustible particles or a combination thereof are utilized. For example, silicious particles including biogenetic silica, such as rice hull ash, or diatomaceous earth or perlite or mixtures thereof can be utilized. Combustible particles, such as rubber, coal, or petroleum coke particles can be used preferably in a size range of about 5 mesh to about 325 mesh. The combustible particles can be used alone or mixed with up to about 70 percent by weight, preferably about 20 percent to about 70 percent by weight, of silicious particles of the clarification medium.

In utilizing biogenetic silica, plants having a highly porous silica structure are burned which contain a minimum of 15 percent silica by weight and preferably 20 percent or more. There are a limited number of plants that contain these high quantities of silica. These are the stalks and hulls of rice, equisetum (horsetail weeds), certain bamboo and palm leaves, particularly polymera, pollen, and the like, all of which when burned leave a porous ash that is highly desirable as a filtration aid or medium.

The presently preferred biogenetic silica is rice hull ash. Rice hulls are high in silica content containing about 18 to 20 percent by weight with the ash having a porous skeletal silica structure having approximately 75 to 80 percent open or void spaces by volume. For a description of the commercial burning of rice hulls to provide rice hull ash, its physical and chemical properties, reference is made to the foregoing patents and applications set forth in the "Background of the Invention."

The combustible particles preferably are rubber particles which can be a waste material, such as what is referred to as "buff rubber" or "crumb rubber." This is obtained by grinding of tire carcasses to provide a flat tire surface for a retread and grinding of new tires to finish them. Also, old tires can be utilized in which the metal and cores are removed, such as by cryogenic processes, which are utilized to separate out the metals such as by magnet from the cord.

The rubber component of the mixture may require treatment with a wetting agent in order to counteract hydrophobic characteristics which are frequently found. The wetting agent prevents the rubber component from separating in the filtration stream thereby becoming ineffective, useless, and in fact a problem. Many low cost and widely known wetting agents such as industrial soaps and detergents are effective in a wide range of dosages from as little as 1 percent to as high as 10 percent by weight and higher. Preferably, the rubber particles should have a mesh size ranging from about 5 to 325 mesh. Advantageously, the addition of a wetting agent addition imposes a negligible cost to the product and has no deleterious effect on the filtration properties. The wetting agent is unnecessary in other than water based liquids and can be excluded, if necessary or desired.

As previously mentioned, current governmental recycling regulations require the Btu content of the resulting filter cake to be at least 5000 Btu's per pound of cake. At the present time, most recylers insist on at least 6000 Btu's per pound of filter cake. The incineration is accomplished by using the filter cake as a fuel in cement or lime kilns, industrial furnaces, and the like.

Advantageously filter presses are available currently on the open market, such as from Hoesch Industries, Inc., JWI, Inc., Netzsch, Inc., Eimco, Inc., and Shriver, Inc., which can be used in the filtering aspects of the present invention.

The following examples demonstrate the advantages of a blended or mixed flocculating and clarifying medium combined into a single product and which performs better than separate use of the components and which solves a number of other problems associated with handling polymer flocculants.

EXAMPLE 1

This example demonstrates a key performance advantage of the flocculating clarifying medium's emulsion breaking capabilities. Emulsion breaking is a common task for polymers, and the degree of success can easily be measured with common turbidity equipment. For this test a standard emulsion of 0.1 percent solution with latex paint (Glidden HD 6180) in water was tested. The emulsion was lightly tinted so that its quality could be quantified by a turbidimeter (Hach 2100P). A weighed quantity of test sample was stirred in a volume of the standard emulsion, typically 500 ml, at 200 rpm for 5 minute intervals. At the end of each interval, the stirring was stopped for one minute to allow for a settling period. Then a small portion of the supernate was removed from a point one inch down from the top of the liquid level. The turbidity of the removed supernate was measured and recorded. Low turbidity values indicate clear liquid. The test was conducted simultaneously on a number of doses. The following Table 1 illustrates the results of a full series of tests.

TABLE 1

Rice Hull Ash + 0.2 wt % Polyacrylamide
(Stockhausen 851BC)
Turbidity vs. Time for Various Doses
(Turbidity in Nephelometric Turbidity Units (NTU))

| | Sample Dose in Grams per Liter | | | |
|---|---|---|---|---|
| Time, Min | 4 | 6 | 8 | 10 |
| 0–5 | 35.4 | 35.8 | 34.7 | 30.22 |
| 5–10 | 11.6 | 12.8 | 8.44 | 11.0 |
| 10–15 | 5.39 | 6.31 | 3.34 | 2.3 |
| 15–20 | 3.34 | 3.63 | 2.54 | 0.87 |
| 20–25 | 1.62 | 0.91 | 0.28 | 0.36 |

It is noted that for each dose the turbidity improved with longer time, and for each time the turbidity improved with increasing dose. The turbidity of the untreated standard emulsion was determined by the use of a flocculation type stirrer (slow paddle variable speed stirrer with four stir positions which is sometimes referred to as a gang mixer) and was about 180 NTU.

EXAMPLE 2

This example is the same as Example 1 but was performed with rice hull ash alone and no polymer treatment. The table below summarizes the findings.

TABLE 2

Rice Hull Ash
Turbidity vs. Time for Various Doses
(Turbidity in Nephelometric Turbidity Units (NTU))

| | Sample Dose in Grams per Liter | | | |
|---|---|---|---|---|
| Time, Min | 4 | 6 | 8 | 10 |
| 0–5 | 296 | 427 | 656 | 917 |
| 5–10 | 289 | 431 | 656 | 930 |
| 10–15 | 305 | 421 | 641 | 922 |
| 15–20 | 300 | 428 | 648 | 926 |
| 20–25 | 308 | 436 | 666 | 936 |

From the data in Table 2, the rice hull ash had almost no effect on the clarity of the standard emulsion.

EXAMPLE 3

This test was performed to determine the performance of the flocculent alone. Table 3 summarizes the results of this test.

TABLE 3

Polyacrylamide (Stockhausen 851BC) Only
Turbidity vs. Time for Various Doses
(Turbidity in Nephelometric Turbidity Units (NTU))

| | Sample Dose in Grams per Liter | | | |
|---|---|---|---|---|
| Time, Min | .008 | .012 | .016 | .020 |
| 0–5 | 42.5 | 40.4 | 37.2 | 39.8 |
| 5–10 | 29.8 | 22.2 | 20.0 | 22.0 |
| 10–15 | 19.6 | 19.2 | 17.7 | 18.5 |
| 15–20 | 17.2 | 19.8 | 18.2 | 19.5 |
| 20–25 | 14.8 | 19.5 | 19.2 | 18.2 |

The data set forth in Table 3 is quite irratic. The inconsistent performance data is most likely a result of the flocculant's difficulty at developing any clarity in a very low solids' environment. The data further demonstrates that this particular flocculant would be a poor choice to break the emulsion in the water.

EXAMPLE 4

In this example a number of other flocculants, natural and synthetic which vary both in charge and magnitude, were tested. The natural flocculants included natural alums, iron sulfates, ferris chloride, calcium chloride, and swelling or bentonitic clays. The synthetic flocculants included polyacrylamide and polyamine. While the resulting detailed data were different, the results were similar. The combined rice hull ash and flocculent achieved better clarity than either product alone. Thus, this combination has tremendous application in a large number of waste water applications where clarity by flocculation and settling is a goal.

EXAMPLE 5

In this example two tests were performed to determine if there was any performance advantage from simultaneous addition of rice hull ash and the flocculent over sequential addition protocols. In the first test a 0.012 gram per liter dose of flocculent was added to 500 ml of standard emulsion which already contained a 5.988 gram per liter dose of rice hull ash. This ratio of flocculent to rice hull ash blend was equivalent to the 0.2 percent concentration set forth in Table 1. The example was mixed, sampled at 5 minute intervals, and the results are set forth in the following Table 4.

TABLE 4

Sample: Rice Hull Ash Added First
Turbidity vs. Time for Various Doses
(Turbidity in Nephelometric Turbidity Units (NTU))

| | Aggregate Dose in Grams per Liter |
|---|---|
| Time, Min | 6 |
| 0–5 | 41.6 |
| 5–10 | 36.2 |
| 10–15 | 31.7 |
| 15–20 | 30.1 |
| 20–25 | 31.9 |

The data in Table 4 indicates a slight improvement in the clarity over the course of this test but demonstrated that the 0.91 NTU at 20–25 minute sample point for the combined product is far superior to the 31.9 NTU achieved by the sequentially added sample at the same level.

EXAMPLE 6

To evaluate the effect of adding the flocculent first, the flocculent was added to a standard emulsion at dosages equivalent to its component dosage in the blended products (the same as in the flocculent only testing). The flocculent treated emulsions were stirred for 30 minutes, and turbidities were measured. Rice hull ash was then added at its corresponding percentage, and the testing at 5 minute intervals commenced. The results are set forth in the following Table 5.

TABLE 5

Polyacrylamide Added First
Turbidity vs. Time for Various Doses
(Turbidity in Nephelometric Turbidity Units (NTU))

| | Sample Dose in Grams per Liter | | | |
|---|---|---|---|---|
| Time, Min | 4 | 6 | 8 | 10 |
| 0–30 | 17.3 | 17.8 | 20.6 | 23.4 |
| RHA ADDED | | | | |
| 0–5 | 9.04 | 6.18 | 3.79 | 3.11 |
| 5–10 | 6.66 | 3.70 | 1.98 | 1.47 |
| 10–15 | 5.26 | 2.39 | 1.14 | 0.93 |
| 15–20 | 4.52 | 1.94 | 0.88 | 0.60 |
| 20–25 | 3.94 | 1.87 | 0.63 | 0.46 |

The turbidities for the dosages of the combined products at the 20–25 minute cut were 1.62, 0.91, 0.28, 0.35 NTU, respectively, which are noticeably better than the above turbidities.

Thus, on the clarity and settling phenomena it is quite clear that the addition of the combined rice hull ash and polyacrylamide is better than either one alone or sequentially added. This is also the case with the other flocculents and aggregating particles set forth in Example 4. Thus, a single product, that is a combination of flocculating and aggregating particles, is a considerable improvement over either one alone.

EXAMPLE 7

The filtration performance of the blended product of Example 1 was demonstrated using the samples from the above flocculation test and flowing them into a convention laboratory pressure filter (Cuno Tri-47 Model #70015-03A). The untreated samples filtered with a flux of about 0.7 gallons per minute per square foot (gpm/sf), but the clarity was poor at an 162 NTU. The fluxes of the combination of rice hull ash and flocculation agent (polyacrylamide) for the various doses are reported in the following Table 6.

TABLE 6

Rice Hull Ash + 0.2 Wt % Polyacrylamide
(Stockhausen 851BC)
Pressure Filtration Flow Test of Samples from Flocculation Test

| | Sample Dose in Grams per Liter | | | |
|---|---|---|---|---|
| | 4 | 6 | 8 | 10 |
| Flux, gpm/sf | 5.5 | 7.3 | 6.6 | 2.8 |
| Filtrate Clarity NTU | 1.69 | 0.39 | 0.26 | 0.16 |

The data in Table 6 is surprising. The fluxes are far higher than expected. It is considered extraordinary when the flux for this filtration apparatus reaches 2 or 2.5 gpm/sf. The flux for these tests was higher than the flux for water with no contamination.

The data in the above Table 6 indicates that the flux value peaks at about 7.3 gpm/sf and then falls off with increasing dosage. This is consistent with filtration theory in that as filter cake thickness increases, such is the case with increasing doses, because the filtration area is constant for all increasing doses, because the filtration area is constant for all dosages, the flow rate through solids decreases at a rate proportioned to the increase in filter cake thickness. The thicker the cake the slower the rate. Further, as filter cake thickness increases, clarity improves. The thicker the filter cake the longer the flow path and the greater the opportunity for solids to be captured. The clarity improves with dosage. While there was a degradation of flux in the 10 gram per liter over dose condition, filtration still proceeded at commercial rates. This is important and significant in industrial application. With a standard flocculation treatment an overdose situation will interrupt operation. Equipment becomes so clogged with excess flocculent that a shut down is needed to clean up the equipment. With the rice hull ash self flocculating filter aid filter flux may degrade slightly but not to any serious degree. Further, the operation will not need to be shut down to clean up the equipment from the overdose.

EXAMPLE 8

In this example, rice hull ash samples were subjected to filtration tests. The results are set forth in the following Table 7.

TABLE 7

Rice Hull Ash + No Flocculant
Flow Test Samples from Flocculation Test

| | Sample Dose in Grams per Liter | | | |
|---|---|---|---|---|
| | 4 | 6 | 8 | 10 |
| Flux, gpm/sf | 0.25 | 0.13 | 0.32 | 0.15 |
| Filtrate clarity NTU | 6.74 | 4.19 | 5.66 | 2.57 |

From Table 7 it is seen that rice hull ash achieves extremely small fluxes, and the filtrate clarities are generally one order of magnitude worse than those for the combined rice hull ash-flocculent blend. This is consistent because it is clear from the data from the stirring/settling/clarity tests that the emulsion was not broken as it was for the combined product.

EXAMPLE 9

In this example the waste water was filtered with polyacrylamide polymer alone. There was no filter flux data as the flocculated waste water only flowed a few milliliters before stopping completely. This is not unusual. Aggregates created only from flocculant treatment are extremely deformable and difficult to filter.

EXAMPLE 10

One commercial application for gravity separation or filtration is to break emulsions and colloids. The large surface area of silica separation of filter aids (9–18 square meters per gram depending on generic type and grain grade) provides sites for coalescence of oil, water emulsions, and the fine porous systems filter out the solids of colloidal systems.

In this example a latex paint waste water required treatment to remove the spent latex. With the latex in it, waste water was a combination of emulsion and colloidal problem. The waste latex contributes suspended solids (TSS), chemical oxygen demand (COD) and biological oxygen demand (BOD) in excess of regulatory limits so must be removed.

The treatment in this example was to remove the latex in a cost effective manner. Removal of the latex was quantified by the clarity of the filtrate (EPA approved 2100p turbidimeter which reports in nephelometric turbidity units (NTU)). The economics in this example are quantified by low chemical additions and high filter flow rates which equate to smaller capital equipment.

This example has the added benefit of demonstrating the performance of both natural and synthetic flocculating in self flocculation technology. The turbidity of the untreated water feed was 892 NTU. The results of this example are illustrated in the following Table 8.

TABLE 8

| | Dose gm/L | Flux gpm/sf | Filtrate Clarity NTU |
|---|---|---|---|
| Rice Hull Ash | 18 | 0.06 | 26.6 |
| 50% RHA and 50% Bentonite Clay | 18 | .26 | 20.1 |
| 99% RHA and 1% Cationic Polyacrylamide (Drew Chemicals Drew Floc 41) | 8 | 2.91 | 0.97 |

EXAMPLE 11

In this example a blend of 47.5 wt. percent rice hull ash, 47.5 wt. percent—20 mesh crumb rubber, and 5 percent wetting agent was tested. Blends of rice hull ash and rubber particles are commonly used in oily sludge treatment. This blend had a flux and a caloric content which were superior to any of the other products tested. A diatomaceous earth product, Eagle Pitcher FW 60, is a popular product for this service and is a pure mineral filter aid which has no native caloric value. As a consequence, the caloric value of the resulting filter cake was low at 2110 btu per pound of filter cake. Data from the testing of rice hull ash was also presented. It was superior to the diatomaceous earth product in both flux and heating values but still did not develop the caloric content necessary for low cost incineration under federal BIF regulations. Also, there are two sets of data from testing the low ash combined with charge flocculation agents such as polymers. The data includes adding the flocculant separately. The following data in Table 9 demonstrates the performance advantage of the flocculant blended version both in flux and calorie content compared to adding the flocculant separately.

TABLE 9

| | Dose gm/L | Flux gpm/sf | Caloric Value Btu/lb |
|---|---|---|---|
| NO POLYMER | | | |
| Diatomaceous Earth Eagle Pitcher FW 60 | 25 | .0154 | 2110 |
| Rice Hull Ash | 25 | 0.056 | 2350 |
| POLYMER ADDED SEPARATELY | | | |
| 47.5% Wt. Rice Hull Ash, 47.5% Wt. - 20 crumb rubber, 5% wetting agent | 25 | 0.180 | 6190 |
| 5.0% Wt Synthetic Polymer (TTA 805) | 1.8 | | |

TABLE 9-continued

|  | Dose gm/L | Flux gpm/sf | Caloric Value Btu/lb |
|---|---|---|---|
| POLYMER BLENDED |  |  |  |
| 47.5% Wt Rice Hull Ash + 47.5% Wt. - 20 crumb rubber 0.4% Wt. Synthetic Polymer [Stockhausen 644BC] | 25 | 0.190 | 6210 |

From the foregoing data in Table 9 the two ash samples including crumb rubber both had a filter cake whose caloric value was in excess of 6000 btu per pound so that they can be disposed of in the low cost and federally regulated BIF program.

EXAMPLE 12

In this example a rice hull ash based metal sequestering filter aid was tested which is most commonly consumed in the treatment of metals laden waste waters. Flocculation or polymer treatment is often required as an adjunct treatment to help defeat problems created by emulsions and/or fine particle precipitates such as organic or inorganic sulfide precipitation. In this example, the waste water was from a manufacturer of chemicals for surface heat treating. The waste water was a combination of reactor wash down and floor waste. It included hydroxide and sulfide precipitated metals as well as emulsion forming surfactants. The results of this test are set forth in Table 10.

TABLE 10

|  | Flux gpm/sf | Filtrate Clarity NTU | Pass TCLP |
|---|---|---|---|
| 75 Wt % Rice Hull Ash, 25 Wt % Synthetic and Natural pozyolans | 0.245 | 1.68 | Yes |
| Polyacrylamide Polymer Only (Stockhausen 655 BC) | 0.096 | 1.97 | No |
| 74.7 Wt % Rice Hull Ash, 24.9 Wt % synthetic and Natural Pozyolans, 0.4 Wt % Synthetic Polymer (Stockhausen 655 BC) | 0.862 | 0.39 | Yes |

From the data in Table 10 the blended version of rice hull ash and flocculent was superior in all performance categories. The data for rice hull ash indicates a usable flux, but the 1.68 NTU filtrate clarity indicates that the emulsion is not completely treated. The flocculent or polymer only is unsatisfactory in all performance areas. The flux is unacceptably low, clarity is poor, and the filter cake fails to federal leaching tests. The flocculent or polymer blended rice hull ash is clearly superior in all performance categories. The foregoing is true of all flocculants and aggregates.

The present invention therefore is well suited and adapted to attain the objects and ends and has the advantages and features mentioned as well as others inherent therein.

While presently preferred embodiments of the invention have been given for the purpose of disclosure, changes can be made therein which are within the spirit of the invention as defined by the scope of the appended claims.

What is claimed is:

1. A combined flocculating and clarifying medium for flocculating and removing solid particles from waste water comprising, a blended mixture of a dry flocculating agent and solid aggregating particles selected from the group consisting of cationic, anionic, and nonionic agents effective to flocculate the solid particles in the waste water into flocculated solid aggregates with the aggregating particles of a size and weight effective to clarify them from the waste water by gravity separation or filtration.

2. The combined flocculating and clarifying medium of claim 1 where, the flocculating agent is present in an amount from about 0.1 percent to about 85 percent by weight.

3. The combined flocculating and clarifying medium of claim 1 where, the flocculating agent is a natural substance.

4. The combined flocculating and clarifying medium of claim 1 where, the flocculating agent is a natural substance and is present in an amount of from about 25 percent to about 85 percent by weight of the blended mixture.

5. The combined flocculating and clarifying medium of claim 1 where, the flocculating agent is a synthetic material.

6. The combined flocculating and clarifying medium of claim 1 where, the flocculating agent is a synthetic material and is present in an amount of from about 0.1 percent to about 5 percent by weight of the blended mixture.

7. The combined flocculating and clarifying medium of claim 1 where, the solid aggregating particles are silicious particles.

8. The combined flocculating and clarifying medium of claim 1 where, the solid aggregating particles are biogenetic silica.

9. The combined flocculating and clarifying medium of claim 1 where, the solid aggregating particles are silicious particles selected from the group consisting of rice hull ash, diatamaceous earth, and perlite.

10. The combined flocculating and clarifying medium of claim 1 where, the solid aggregating particles comprise combustible particles and are present in an amount sufficient to provide at least 5000 Btu per pound of the blended mixture including the filtered flocculated solid particles.

11. The combined flocculating and clarifying medium of claim 1 where, the solid aggregating particles are selected from the group comprising rubber, coal, petroleum coke, and mixtures thereof, particles in a mesh size of from about 5 mesh to 325 mesh and have a Btu content of at least 5000 Btu per pound of the blended mixture including the flocculated solid particles clarified.

12. A composition of matter comprising, a blended mixture of a dry flocculating agent and silicious particles effective to flocculate and aggregate solid particles in waste waters effective to clarify them from waste water by gravity separation.

13. The composition of matter of claim 12 where, the dry flocculating agent is a natural material and is present in the blended mixture in the range of about 25 percent to about 80 percent by weight.

14. The composition of matter of claim 13 where, the silicious particles are selected from the group consisting of rice hull ash, diatomaceous earth, and perlite.

15. The composition of matter of claim 12 where, the dry flocculating agent is a synthetic material and is present in the blended mixture in the range of about 0.1 percent to about 5.0 percent by weight.

16. The composition of matter of claim 15 where, the silicious particles are selected from the group consisting of rice hull ash, diatomaceous earth, and perlite.

17. The composition of matter of claim 12 where, the filtering particles have a Btu content of at least 5000 Btu per pound of the mixture including the flocculated solid aggregates.

18. The composition of matter of claim 12 where, the blended mixture includes a polyvalent metal ion, at least some of the silicious particles dissolve in the waste water when having a pH of at least 12 to form a soluble silicate, the polyvalent metal ion being present in an amount sufficient to form a silicious cement with the soluble silicate and to chemically fix the flocculated solids in the silicious cement.

19. The composition of matter of claim 18 where, the silicious particles are selected from the group consisting of rice hull ash, diatomaceous earth, and perlite.

* * * * *